United States Patent

[11] 3,556,266

| [72] | Inventor | Richard H. McCarthy<br>Milwaukee, Wis. |
|---|---|---|
| [21] | Appl. No. | 772,317 |
| [22] | Filed | Oct. 31, 1968 |
| [45] | Patented | Jan. 19, 1971 |
| [73] | Assignee | Stearns Electric Corporation<br>Milwaukee, Wis.<br>a corporation of Wisconsin |

[54] CALIPER BRAKE
5 Claims, 5 Drawing Figs.

[52] U.S. Cl. .................................................. 188/171,
188/72.3
[51] Int. Cl. ..................................................... B60t 13/04,
F16d 55/22
[50] Field of Search ........................................ 188/170,
171, 73, 72.3

[56] References Cited
UNITED STATES PATENTS

| 2,009,121 | 7/1935 | Price | 188/171 |
| 2,506,028 | 5/1950 | Le Tourneau | 188/171 |
| 2,543,830 | 3/1951 | Burrus | 188/171 |
| 3,357,528 | 12/1967 | Verlinde | 188/171 |
| 3,470,987 | 10/1969 | Kroeger | 188/171 |

Primary Examiner—Duane A. Reger
Attorney—Wheeler, Wheeler, House & Clemency

ABSTRACT: Guide bolts support one or more brake plates and also support pressure springs which bias the plates toward each other and into engagement with one or more intervening brake discs. The guide bolts connect to a solenoid frame which provides a flux path and is centered between the bolts to support the winding and to guide an armature which is centered in the plane of the bolts and attached centrally to the first of the caliper brake plates for the retraction thereof against the bias of the springs when the solenoid is energized, whereby energization of the solenoid releases the brake. A second like unit used in a diametrically opposite location provides a balanced supplement to the braking action of the first unit.

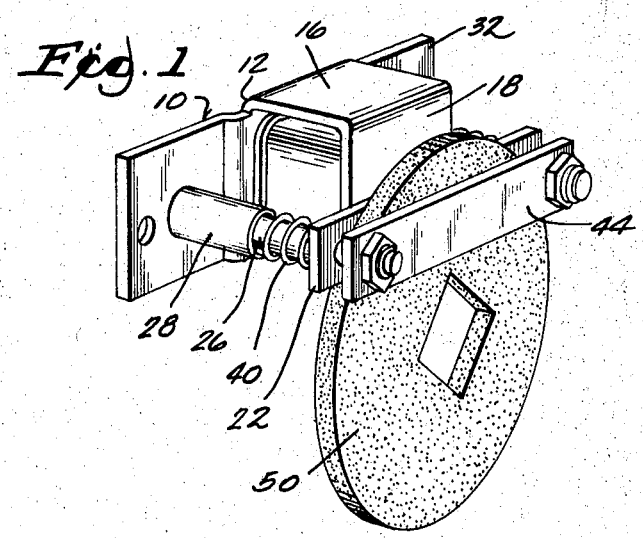
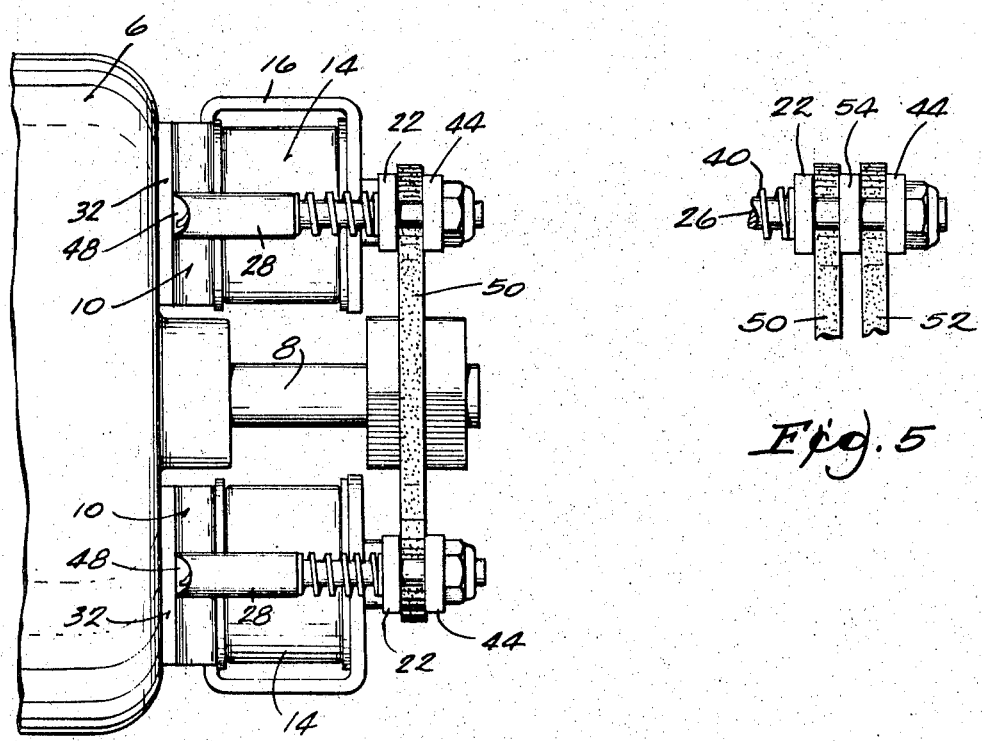

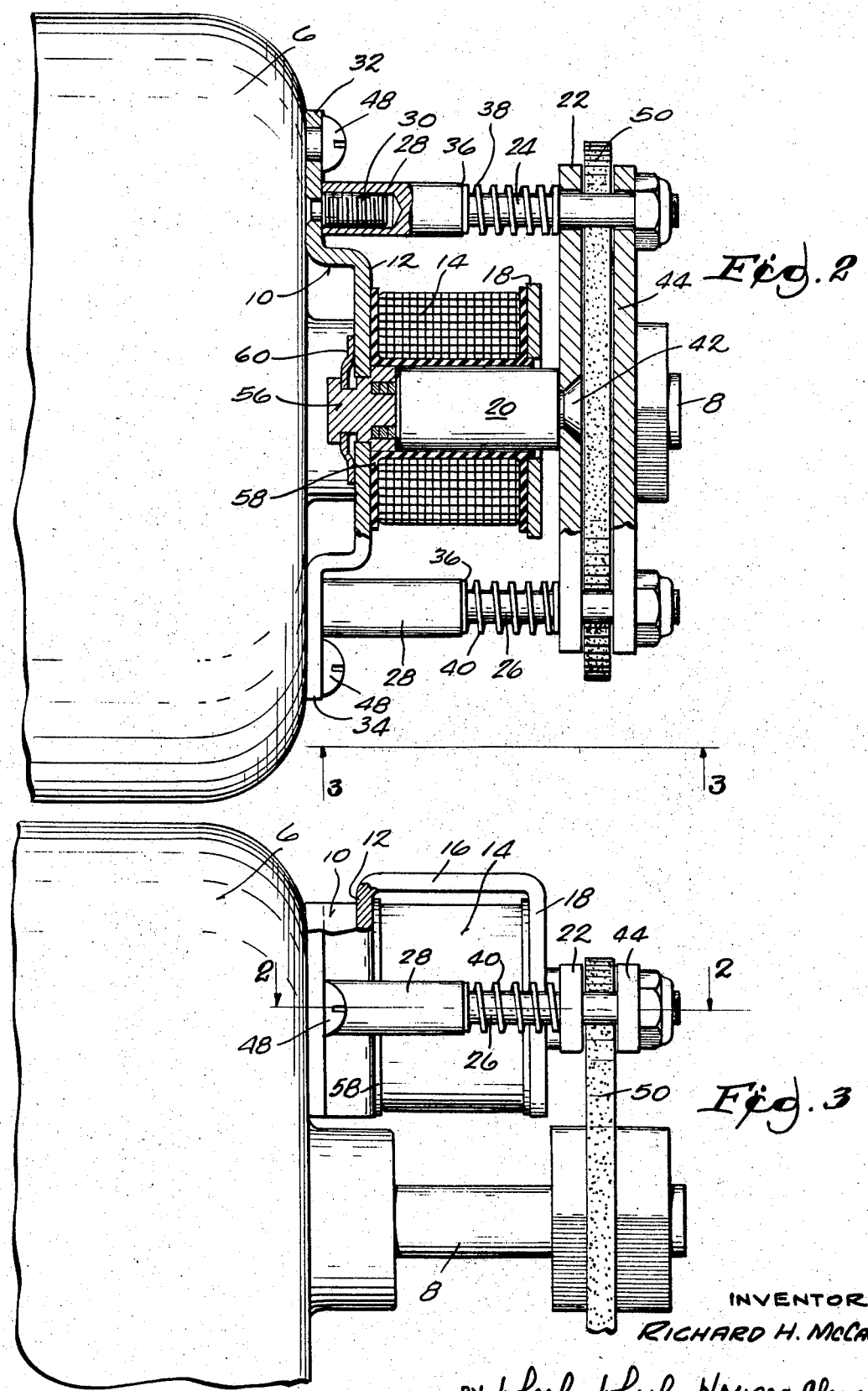

CALIPER BRAKE

BACKGROUND OF INVENTION

It is common to provide brakes for motor armature shafts and to release such brakes by means of a solenoid when the motor is energized. As compared with conventional devices for this purpose, the instant structure is extremely simple and relatively inexpensive, the magnetic frame of the solenoid constituting the support therefor.

SUMMARY OF INVENTION

The invention consists of a simplified and low cost brake unit which is particularly effective, the solenoid armature being in the plane of the bolt which guides the brake plate or plates and such plates being biased equally adjacent their opposite ends by springs encircling the guide bolts. The compactness of the device is such that it occupies only a part of the space at one side of the motor armature shaft. Additional braking effect is provided by a second unit identical with the first and disposed in relatively inverted position at the other side of the armature shaft to provide balanced braking action. It is further contemplated that the braking effect of such a unit or units may be increased by the use of plural caliper plates and brake discs.

BRIEF DESCRIPTION OF DRAWINGS

FIG. 1 is a view in perspective of a caliper brake unit.

FIG. 2 is a view of the caliper brake unit in horizontal section on the line 2-2 of FIG. 3.

FIG. 3 is a view of the unit in side elevation on the line 3-3 of FIG. 2.

FIG. 4 is a view similar to FIG. 3 showing a modified arrangement in which a second inverted unit supplements the action of the unit shown in FIG. 3.

FIG. 5 is a fragmentary detail view showing a modification of FIG. 2 to illustrate the use of multiple plates and brake discs.

DETAILED DESCRIPTION

The unit per se as separately illustrated in FIG. 1 may be mounted in any desired manner. Usually, such a brake is carried by suitable brackets or bolts from the shell 6 of an electric motor having an armature shaft 8, the rotation of which the brake is intended to arrest as soon as the motor is deenergized. However, the unit may be otherwise mounted.

As shown, there is a frame at 10 upon which the entire unit is assembled. The frame has a portion 12 which supports a solenoid winding 14 and it has a horizontal web 16 overlying the solenoid and another portion 18 which provides the forward pole and extends downwardly in front of the solenoid as shown in FIG. 3.

The armature 20 extends axially through the solenoid and is connected at its outer end to a brake plate 22 guided on a pair of bolts 24 and 26 which are at opposite sides of the solenoid and have enlarged extremities 28 anchored by cap screws 30 to the lateral wings 32 and 34 of the magnet frame 10. The axes of the bolts 24 and 26 are in the same plane as the axis of the armature 20. The connection to the plate 22 is central, midway between the bolts.

The enlarged portions 28 of the respective bolts provide shoulders which serve as seats 36 for the compression springs 38 and 40, the outer ends of which are seated against the ends of the brake plate 22, thus tending to bias the brake plate away from the solenoid winding 14. Because of the swaged end connection 42, the armature and brake plate move unitarily in both directions.

Opposed to the brake plate 22 is a complementary brake plate 44 supported from the magnet frame 32 at the ends of the respective bolts 24 and 26. These bolts may sometimes connect the magnet frame to the motor shell 6 but it is preferred to use separate mounting bolts 48 for this purpose.

Interposed between the plates 22 and 44 is a brake disc 50 having a central mounting on the armature shaft 8. FIG. 5 shows that if desired there may be a second disc 52 with another floating plate 54 mounted on the guide bolts 24, 26 between the two discs. The compression springs 38 and 40 will normally maintain friction contact between the several plates and the several discs, thereby restraining the armature shaft from rotation except when the solenoid 14 is energized. Usually, the electrical connections are such that the solenoid will be energized when the motor is energized, thus retracting the brake plate and relieving the stack of discs from spring bias for accommodating free rotation of the armature shaft.

The solenoid coil may be positioned on the solenoid frame in any desired manner. In the preferred arrangement illustrated, there is an inner solenoid pole at 56 which supports the solenoid core 58 and is releasably anchored to the frame 10 by means of the fastener 60.

As best shown in FIG. 4, the braking of the armature shaft can be augmented if desired by duplicating the brake structure shown. Because the illustrated brake is very shallow in a direction radially of the armature shaft, and is disposed only at one side of that shaft, the space at the other side of the shaft is vacant and a second brake unit identical with the first may be placed in that space in a position inverted with respect to the brake unit shown in FIG. 3. Here the effect on the disc will be balanced.

Despite the fact that the plates 22 and 44 have such minimum radial extent, comprising mere straps elongated on a minor chord of the brake disc 50, the structure herein disclosed is particularly effective because of the balanced organization of the unit per se, the solenoid armature 20 being directly connected at 42 to the center of the strap or plate 22 and guided equally at its opposite ends on the bolts 24 and 26 and subjected equally at its opposite ends to the bias of the springs 38 and 40. It is also a factor in the simplicity and effectiveness of this unit that the poles and the flux path between the poles are entirely provided by a simple mounting frame which has been formed from a flat plate and which serves to position the guide bolts 24 and 26 as well as the solenoid winding 14.

I claim:

1. A caliper brake unit for retarding rotation of a rotatable disc said unit comprising a pair of narrow brake plates for engaging opposite faces of such a disc on a minor chord thereof, a solenoid winding having an armature connected centrally with one of said brake plates, a fixed mounting comprising a frame of magnetic material supporting the winding and provided with axially projecting guide members along which the ends of the last mentioned brake plate are reciprocable, said guide members being attached to the other of said brake plates for the support thereof from said frame, and spring means extending along the guide members and bearing on the ends of the brake plate guided thereon for biasing said last mentioned brake plate toward said other brake plate, subject to retraction when the solenoid is energized.

2. A caliper brake according to claim 1 in which said frame has a rear frame plate provided with wings extending laterally and with which said guide members are connected, said rear frame plate having a forwardly extending fore-and-aft frame plate integrally connected therewith and a downwardly extending forward frame plate integrally connected with the fore-and-aft frame plate and provided with an aperture through which said armature is connected with the brake plate guided on said guide member.

3. A caliper brake according to claim 1 in which said guide members comprise bolts having shoulders at their rear ends which constitute seats for the springs which bias the brake plate guided on said guide members, the said bolts being substantially coplanar with said armature.

4. The combination with a rotatable shaft having a brake disc thereon, of a brake unit comprising straplike brake plates disposed to engage opposite sides of the disc on a minor chord of said disc guide means supporting one of said brake plates in relatively fixed position, means guiding the other of said brake plates for movement toward said one brake plate to clamp face portions of the disc between the brake plates, a solenoid having a magnetically conductive frame with which said guide means has fixed connection, said solenoid having an armature centered between said guide means and connected with the brake plate guided thereby, spring means extending along the respective guide means and engaged with opposite ends of said last mentioned brake plate for biasing said brake plate in a direction to apply friction to said disc.

5. A caliper brake according to claim 4 in further combination with a duplicate brake unit including brake plates engageable with a different minor chord of the disc angularly offset from the brake plates of the brake unit first mentioned, said brake plates of said second unit having their own positioning and guiding means and their own solenoid and solenoid frame as a unit independent of the corresponding parts of the unit first mentioned but in balanced relation thereto.